(12) United States Patent
Lim et al.

(10) Patent No.: US 10,447,751 B2
(45) Date of Patent: Oct. 15, 2019

(54) PARALLEL TRANSCODING DIRECTLY FROM FILE IDENTIFIER

(71) Applicants: Sony Corporation, Tokyo (JP); Sony Media Cloud Services LLC, Culver City, CA (US)

(72) Inventors: Sheldon Lim, San Francisco, CA (US); Brian Laske, Orange, CA (US); Henry Anderson, Redmond, WA (US); Art Fort, New Smyrna Beach, FL (US)

(73) Assignees: SONY CORPORATION, Tokyo (JP); SONY MEDIA CLOUD SERVICES, LLC, Culver City, CA (US)

( * ) Notice: Subject to any disclaimer, the term of this patent is extended or adjusted under 35 U.S.C. 154(b) by 387 days.

(21) Appl. No.: 14/868,162

(22) Filed: Sep. 28, 2015

(65) Prior Publication Data

US 2017/0093946 A1 Mar. 30, 2017

(51) Int. Cl.
*H04L 29/06* (2006.01)
*H04L 29/08* (2006.01)

(52) U.S. Cl.
CPC .......... *H04L 65/602* (2013.01); *H04L 67/02* (2013.01); *H04L 67/06* (2013.01); *H04L 67/1097* (2013.01); *H04L 67/2823* (2013.01); *H04L 67/42* (2013.01)

(58) Field of Classification Search
CPC ..... H04L 29/08; H04L 67/1097; H04L 67/42; H04L 29/06; H04L 67/06; H04L 65/602; H04N 19/40
USPC .......................................... 709/203, 200, 224
See application file for complete search history.

(56) References Cited

U.S. PATENT DOCUMENTS

| | | | |
|---|---|---|---|
| 8,165,343 B1* | 4/2012 | McGowan | H04N 21/8358 348/461 |
| 2002/0010746 A1* | 1/2002 | Jilk, Jr. | G06F 17/3089 709/206 |
| 2011/0140937 A1 | 6/2011 | Lai et al. | |
| 2012/0243601 A1 | 9/2012 | Schmit et al. | |
| 2013/0114744 A1 | 5/2013 | Mutton | |
| 2013/0308638 A1 | 11/2013 | Grossman et al. | |
| 2015/0189225 A1* | 7/2015 | Soroushian | H04N 7/0127 348/459 |
| 2016/0179826 A1* | 6/2016 | Batra | H04L 67/1097 707/756 |

* cited by examiner

*Primary Examiner* — El Hadji M Sall
(74) *Attorney, Agent, or Firm* — Procopio, Cory, Hargreaves & Savitch LLP

(57) ABSTRACT

Transcoding a file located within a network directly from a file identifier, including: retrieving the file using the file identifier; segmenting the file into a plurality of chunks; and transcoding the plurality of chunks using a distributed transcoder. Key words include segmenting and distributed transcoding.

23 Claims, 2 Drawing Sheets

PARALLEL TRANSCODING DIRECTLY FROM FILE IDENTIFIER

BACKGROUND

Field of the Invention

The present invention relates to parallel transcoding, and more specifically, to transcoding directly from a file identifier and maximizing processor utilization.

Background

The process of converting a media file or object from one format to another is referred to as transcoding, which is often used to convert video formats. However, the transcoding can be used to convert other formats including audio, picture, document, and other media content. The transcoding can also be used to fit markup language files (e.g. hypertext markup language (HTML) files) and graphics files to the unique constraints of mobile devices and other Web-enabled products.

Typically, processes start by copying a remote source file to a hard drive on a local network prior to transcoding. A drawback to this type of processes can be that the system reads every bit once to get it transferred to the network and then reads the bits again as the system decodes and encodes the frames. Thus, the system reads the bits that represent each frame twice.

SUMMARY

The present invention provides for transcoding of a file located within a network directly from a file identifier.

In one implementation, a method of transcoding a file located within a network directly from a file identifier is disclosed. The method includes: retrieving, at a server within the network, the file using the file identifier; segmenting, at the server, the file into a plurality of chunks; and transcoding the plurality of chunks using a distributed transcoder.

In another implementation, system of transcoding a file located within a network directly from a file identifier is disclosed. The system includes: a storage unit; a processor configured to retrieve the file from the storage unit using the file identifier; a segmenting unit configured to segment the file into a plurality of chunks; and a distributed transcoder configured to transcode the plurality of chunks.

In another implementation, an apparatus for transcoding a file located within a network directly from a file identifier is disclosed. The apparatus includes: means for retrieving the file using the file identifier at a server in the network; means for segmenting the file into a plurality of chunks at the server; and means for performing distributed transcoding of the plurality of chunks.

In yet another implementation, an apparatus for transcoding a file located within a network directly from a file identifier is disclosed. The apparatus includes: a processor; a computer-readable storage medium coupled to the processor, the computer-readable storage medium storing a computer program to transcode a file located within a network directly from a file identifier, the computer program comprising instructions executable by the processor that cause the apparatus to: retrieve the file using the file identifier; segment the file into a plurality of chunks; and perform distributed transcoding of the plurality of chunks.

Other features and advantages of the present invention should be apparent from the present description which illustrates, by way of example, aspects of the invention.

BRIEF DESCRIPTION OF THE DRAWINGS

The details of the present invention, both as to its structure and operation, may be gleaned in part by study of the appended further drawings, in which like reference numerals refer to like parts, and in which.

DETAILED DESCRIPTION

Certain implementations as disclosed herein include a system which provides for transcoding a file located within a network directly from a file identifier such as a uniform resource locator (URL) as the source file. This substantially reduces the need to copy files to local hard drives. Rather than downloading the file and then reading it again to transcode, the system reads the frames once to transcode. Thus, the system uses a transcoder that can transcode from a hypertext transfer protocol (HTTP) source. However, transcoding from an HTTP source can be slow because the transcoding depends on the response time of a server and the transfer speed across the Internet for a single byte stream. This can result in the processor utilization below 100%. Thus, some implementations are configured to maximize the utilization of the processing on a transcoding node by running multiple instances to handle incoming streams, which increases efficiency and reduces overall cost. Other implementations are configured to reduce the load on servers, and allow the system to transcode even faster. In one implementation, a segmented or chunked solution is used to improve the performance of the system in accessing remote source file bits (e.g., data resident on a web site).

After reading this description it will become apparent how to implement the disclosure in various implementations and applications. However, although various implementations of the present disclosure will be described herein, it is understood that these implementations are presented by way of example only, and not limitation. As such, this detailed description of various implementations should not be construed to limit the scope or breadth of the present disclosure.

Some implementations of the transcoding system are for transcoding video, such as television or movie content. Other types of video or data can also be processed, such as audio, sensor data, or image data (e.g., medical images). In one example, a transcoding system provides medical images (e.g., a magnetic resonance imaging (MRI) image) to multiple client devices and systems and so transcodes the original information to appropriate target formats. The original image data is stored on a server. The transcoding system requests the data in multiple channels or streams (e.g., in segments) using an image tool that can decode directly from a data stream received from a remote source. The transcoding system runs multiple decoders to decode the incoming data and transcodes the data to the target format(s), serving the resulting data to the target devices.

Figure 1:
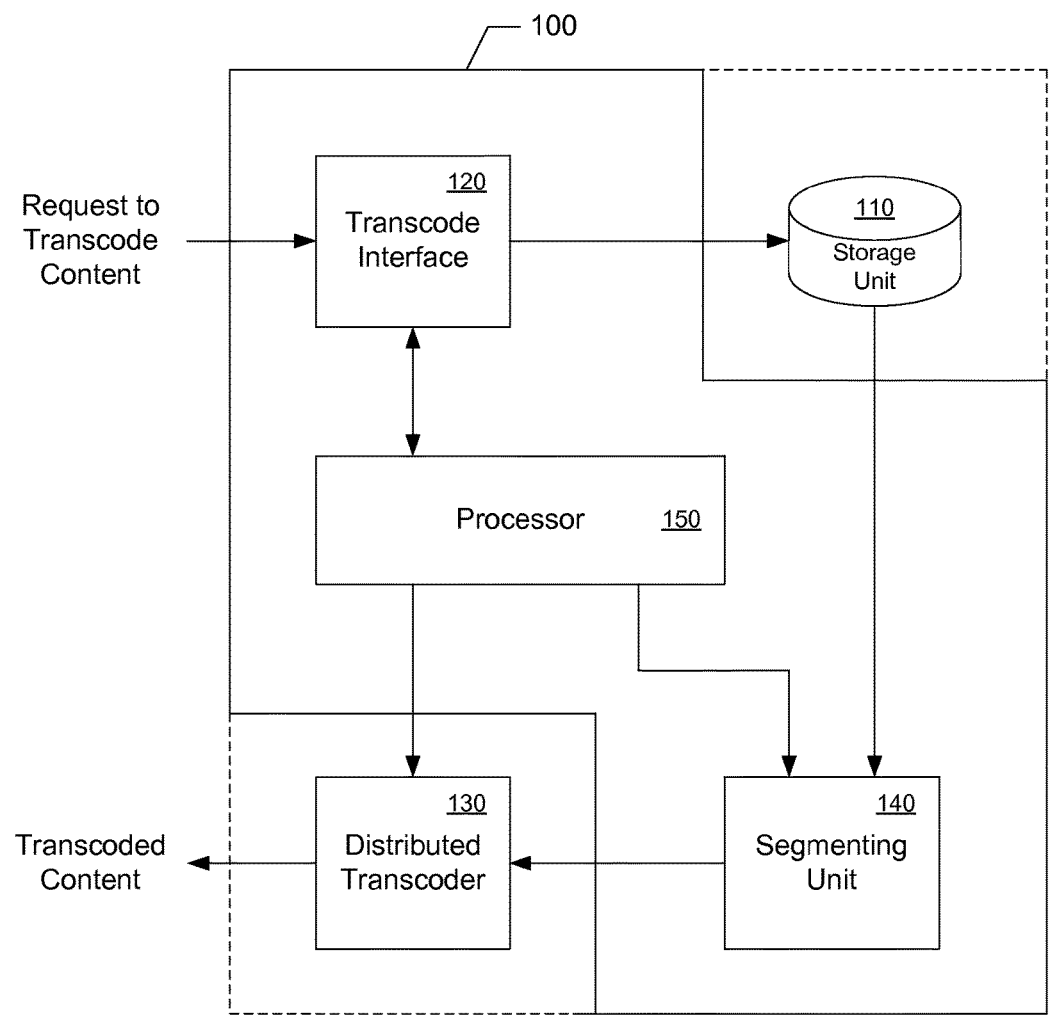
FIG. 1 is a functional block diagram of a transcoding system in accordance with one implementation of the present disclosure.

FIG. 1 is a functional block diagram of a transcoding system 100 in accordance with one implementation of the present disclosure. In one implementation, the transcoding system 100 may be a content provider server. In another implementation, the transcoding system 100 is a specifically-configured transcoding server. In the illustrated implementation of FIG. 1, the transcoding system 100 includes a storage unit 110, a transcode interface 120, a distributed transcoder 130, a segmenting unit 140, and a processor 150. In one implementation, the storage unit 110 is configured as a computer-readable storage medium.

In the illustrated implementation of FIG. 1, the transcode interface 120 receives a request to transcode content (along with URL of content or content itself to be transcoded, target format, and/or target device type) from a target device. In one implementation, the target device is a client device such as a laptop, a mobile device (e.g., a media player), or a desktop computer. In other implementations, the target device may be a content provider device, a network storage system, or components in a content delivery network that are streaming content to a client device in a particular format. The transcode interface 120 sends the received information to the processor 150, which directs the transcode interface to retrieve (or send) the content from (or to) the storage unit 110. This would allow the transcoding system 100 to transcode directly from the URL as the source file. In one implementation, the storage unit 110 is configured within the transcoding system 100. In another implementation, the storage unit 110 is located remote from the transcoding system 100 such as within a content provider server. In yet another implementation, the storage unit 110 is a distributed system, wherein a content file is distributed over multiple storage providers, so that no one storage provider would have full access to the content or be able to reconstruct the full content. The processor 150 retrieves the content file from the distributed system. The retrieved content is then sent from the storage unit 110 to the segmenting unit 140, which segments or chunks the retrieved content into a plurality of segments or chunks under the control of the processor 150.

The segments or chunks generated by the segmenting unit 140 are then sent to a distributed transcoder 130. In one implementation, the distributed transcoder 130 is made up of distributed transcoding resources, typically servers with available processing power and programmed to assist in the transcoding process. These transcoding resources may be dedicated machines (e.g., computers) as well as machines that are shared with other processes. In another implementation, the distributed transcoder 130 is configured as multiple instances of a processing tool located within the transcoding system or network, wherein each instance processes a segment or chunk of the plurality of segments or chunks generated by the segmenting unit 140. In yet another implementation, the distributed transcoder 130 is configured as multiple physical transcoders situated within several different locations and/or servers, wherein each transcoder transcodes a segment or chunk of the plurality of segments or chunks generated by the segmenting unit 140. Once the transcoding is done, the distributed transcoder 130 sends the plurality of transcoded segments or chunks to the target device. Each segment or chunk can include an identifier that identifies the segment or chunk within the content so that the segments or chunks of the content can be pieced together into a single unit. In one implementation, the process of piecing the segments or chunks together is done in the target device. In another implementation, the process of piecing the segments or chunks together is done in the transcoding system 100 under the control of the processor 150.

Figure 2:
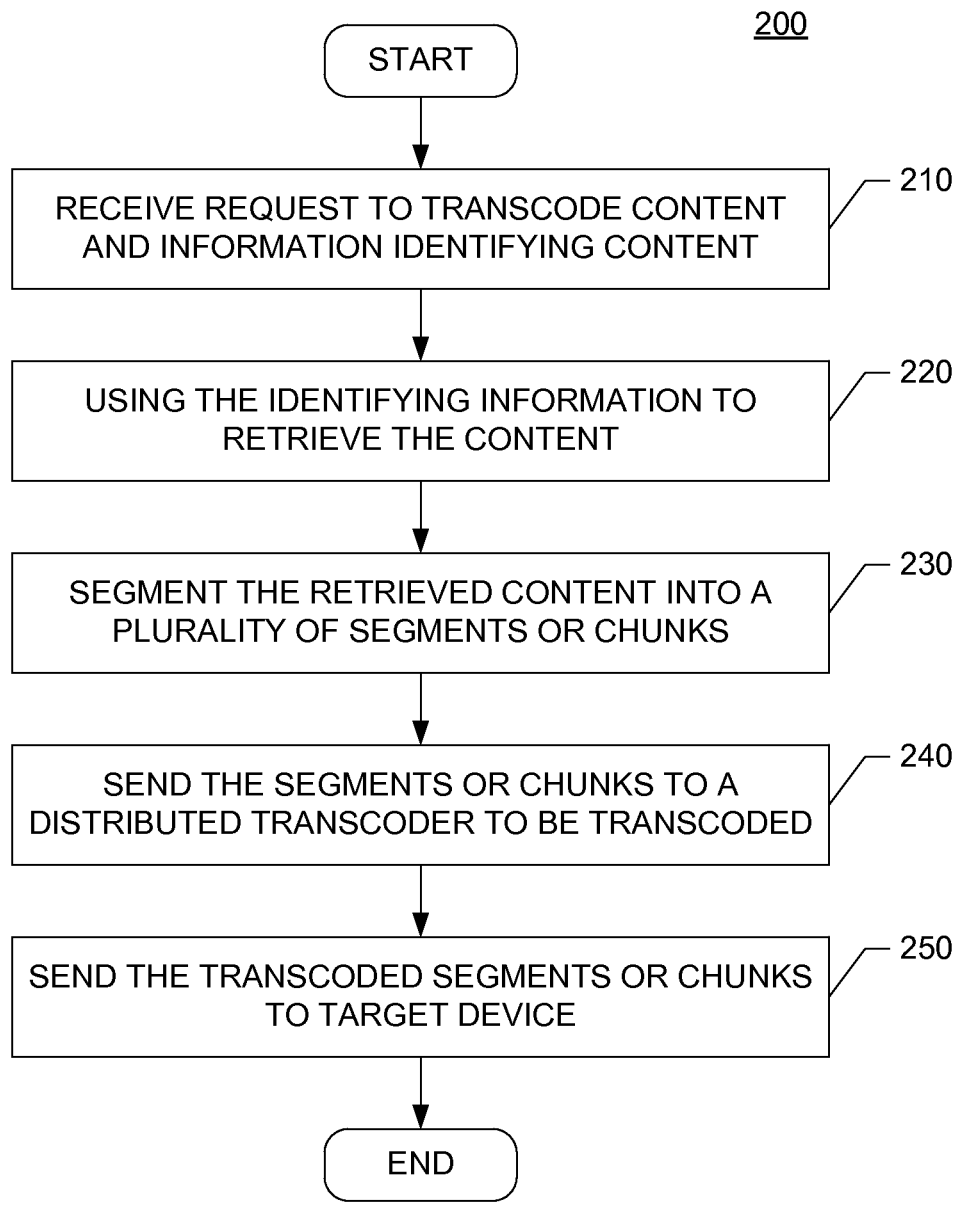
FIG. 2 is a flow diagram of a transcoding process in accordance with one implementation of the present disclosure.

FIG. 2 is a flow diagram of a transcoding process 200 in accordance with one implementation of the present disclosure. In the illustrated implementation of FIG. 2, a request to transcode content is received, at box 210, along with a URL of content or content itself to be transcoded, a target format, and/or a target device type from a target device. In one implementation, the target device is a client device. In other implementations, the target device may be a content provider device, a network storage system, or components in a content delivery network that are streaming content to a client device in a particular format.

The received information is then used to retrieve (or send) the content from (or to) the storage unit, at box 220. This would allow the transcoding process 200 to transcode directly from the URL as the source file. In one implementation, the storage unit is configured within a transcoding system running the transcoding process 200. In another implementation, the storage unit is located remote from the transcoding system such as within a content provider server. In yet another implementation, the storage unit is a distributed unit, wherein a content file is segmented and distributed over multiple storage providers, so that no one storage provider would have full access to the content or be able to reconstruct the full content. Thus, segmenting provides an additional hurdle for a hacker or other entity to access the content. The retrieved content is then segmented into a plurality of segments or chunks, at box 230.

The segments or chunks are then sent to a distributed transcoder, at box 240. In one implementation, the distributed transcoder is made up of distributed transcoding resources, typically servers with available processing power and programmed to assist in the transcoding process. These transcoding resources may be dedicated machines as well as machines that are shared with other processes. In another implementation, the distributed transcoder is configured as multiple instances of a processing tool located within the transcoding system, wherein each instance processes a segment or chunk of the plurality of segments or chunks. In yet another implementation, the distributed transcoder is configured as multiple transcoding processes running on several different locations and/or servers, wherein each transcoding process transcodes a segment or chunk of the plurality of segments or chunks.

In one implementation, each of the plurality of transcoding processes corresponds to and transcodes a chunk of the plurality of chunks. In another implementation, there is no one-to-one correspondence between a transcoding process and a chunk. For example, a transcoding process may span many chunks. In another example, a single chunk may need to be processed by multiple transcoding processes.

Once the transcoding is done, the distributed transcoder sends the plurality of transcoded segments or chunks to the target device, at box 250. Each segment or chunk can include an identifier that identifies the segment or chunk within the content so that the segments or chunks of the content can be pieced together into a single unit. In one implementation, the process of piecing the segments or chunks together is done in the target device. In another implementation, the process of piecing the segments or chunks together is done in the transcoding system.

One implementation includes one or more programmable processors and corresponding computer system components to store and execute computer instructions. Combinations of hardware, software, and firmware can also be used. For example, in the transcoding system, storage, processing, segmenting, distributing, and transcoding can be performed by one or more computer systems executing appropriate computer instructions on one or more processors utilizing appropriate components and systems (such as memory, computational units, buses, etc.).

Additional variations and implementations are also possible. While examples show requests to transcode content being received at the server from a target device (e.g., a client device), and the server segmenting, distributing, transcoding, and downloading the transcoded segments of the content to the client device, examples could be used for the client device to segment the content into chunks and upload the chunks to be transcoded by the server.

The above description of the disclosed implementations is provided to enable any person skilled in the art to make or use the disclosure. Various modifications to these implementations will be readily apparent to those skilled in the art, and the generic principles described herein can be applied to other embodiments without departing from the spirit or scope of the disclosure. Accordingly, the techniques are not limited to the specific examples described above. Thus, it is to be understood that the description and drawings presented herein represent a presently preferred embodiment of the disclosure and are therefore representative of the subject matter that is broadly contemplated by the present disclosure. It is further understood that the scope of the present disclosure fully encompasses other embodiments that may become obvious to those skilled in the art and that the scope of the present disclosure is accordingly limited by nothing other than the appended claims.

What is claimed is:

1. A method comprising:
    transcoding a file located within a network directly from a file identifier including a hypertext transfer protocol source rather than downloading and storing the file on a local device and reading the file again to transcode the file, the transcoding comprising:
    retrieving, at a server within the network, the file using the file identifier,
    wherein the file is retrieved to a storage unit of the server coupled to the file identifier;
    segmenting, at the server, the file into a plurality of chunks;
    transcoding the plurality of chunks using a distributed transcoder; and
    downloading the transcoded plurality of chunks to the local device so that the transcoded file can be reconstructed at the local device by assembling the transcoded plurality of chunks.

2. The method of claim 1, wherein the distributed transcoder is made up of a plurality of distributed transcoding resources.

3. The method of claim 2, wherein the plurality of distributed transcoding resources includes a plurality of dedicated computers.

4. The method of claim 1, wherein the distributed transcoder is configured as multiple instances of a processing tool located within the network.

5. The method of claim 4, wherein each instance of the multiple instances transcodes a chunk of the plurality of chunks.

6. The method of claim 1, wherein the distributed transcoder is configured as a plurality of transcoding units situated within several different servers.

7. The method of claim 6, wherein each transcoding unit transcodes a chunk of the plurality of chunks.

8. The method of claim 1, further comprising
    receiving, at the server, a request to transcode the file identified by the file identifier from a target device.

9. The method of claim 8, further comprising
    receiving, from the target device, a target format of a transcoded file and a type of the target device.

10. The method of claim 8, wherein the target device is a content provider device configured to stream content of the file to a client device in a transcoded format.

11. The method of claim 8, wherein each chunk of the plurality of chunks includes an identifier that identifies a position of each chunk within the plurality of chunks to enable the target device to generate the file in a transcoded format using the identifier and the plurality of chunks.

12. The method of claim 1, wherein each chunk of the plurality of chunks includes an identifier that identifies a position of each chunk within the plurality of chunks.

13. The method of claim 12, further comprising
    generating, at the server, the file in a transcoded format using the identifier and the plurality of chunks.

14. A system of transcoding a file located within a network directly from a file identifier rather than downloading and storing the file on a local device and reading the file again to transcode the file, the system comprising:
    a storage unit coupled to the file identifier;
    a processor configured to retrieve the file to the storage unit using the file identifier, the processor configured to transcode the file directly from the file identifier including a hypertext transfer protocol source;
    a segmenting unit configured to segment the file into a plurality of chunks; and
    a distributed transcoder configured to transcode the plurality of chunks and download the transcoded plurality of chunks to the local device so that the transcoded file can be reconstructed at the local device by assembling the transcoded plurality of chunks.

15. The system of claim 14, wherein the distributed transcoder comprises a plurality of dedicated computers.

16. The system of claim 14, wherein the distributed transcoder is configured as multiple instances of a processing tool located within the network.

17. The system of claim 16, wherein each instance of the multiple instances transcodes a chunk of the plurality of chunks.

18. The system of claim 16, wherein the distributed transcoder is configured as a plurality of transcoding units situated within several different servers.

19. The system of claim 18, wherein each transcoding unit transcodes a chunk of the plurality of chunks.

20. The system of claim 14, wherein the storage unit is configured as a distributed system.

21. An apparatus comprising:
    means for transcoding a file located within a network directly from a file identifier including a hypertext transfer protocol source rather than downloading and storing the file on a local device and reading the file again to transcode the file, the means for transcoding comprising:
    means for retrieving the file using the file identifier,
    wherein the file is retrieved to a storage unit coupled to the file identifier;
    means for segmenting the file into a plurality of chunks at the server;
    means for performing distributed transcoding of the plurality of chunks; and
    means for downloading the transcoded plurality of chunks to the local device so that the transcoded file can be reconstructed at the local device by assembling the transcoded plurality of chunks.

22. An apparatus comprising:
    a processor;
    a computer-readable storage medium coupled to the processor, the computer-readable storage medium storing a computer program, the computer program comprising instructions executable by the processor that cause the apparatus to:

transcode a file located within a network directly from a file identifier including a hypertext transfer protocol source rather than downloading and storing the file on a local device and reading the file again to transcode the file, the transcoding comprising instructions executable by the processor that cause the apparatus to:

retrieve the file using the file identifier,
wherein the file is retrieved to a storage unit coupled to the file identifier;

segment the file into a plurality of chunks;

perform distributed transcoding of the plurality of chunks; and download the transcoded plurality of chunks to the local device so that the transcoded file can be reconstructed at the local device by assembling the transcoded plurality of chunks.

23. The apparatus of claim 22, wherein the apparatus is a media player.

\* \* \* \* \*